United States Patent [19]
Petite

[11] Patent Number: 5,926,531
[45] Date of Patent: Jul. 20, 1999

[54] TRANSMITTER FOR ACCESSING PAY-TYPE TELEPHONES

[75] Inventor: Thomas D. Petite, Douglasville, Ga.

[73] Assignee: StatSignal Systems, Inc., Atlanta, Ga.

[21] Appl. No.: 08/895,720

[22] Filed: Jul. 17, 1997

Related U.S. Application Data

[63] Continuation-in-part of application No. 08/825,576, Mar. 31, 1997.
[60] Provisional application No. 60/040,316, Feb. 14, 1997.

[51] Int. Cl.$^6$ .............................. H04M 17/00; G06K 5/00
[52] U.S. Cl. ....................... 379/144; 379/91.01; 235/382
[58] Field of Search ........................... 379/93.01, 93.02, 379/91.01, 111, 112, 114, 130, 140, 144, 143, 357, 354, 355; 235/380, 381, 382, 492; 340/825.33, 825.34

[56] References Cited

U.S. PATENT DOCUMENTS

| | | | |
|---|---|---|---|
| 3,906,460 | 9/1975 | Halpern | 340/172 |
| 4,605,844 | 8/1986 | Haggan | 235/380 |
| 4,757,185 | 7/1988 | Onishi | 235/379 |
| 4,800,543 | 1/1989 | Lyndon-James et al. | 368/10 |
| 4,851,654 | 7/1989 | Nitta | 235/492 |
| 4,897,644 | 1/1990 | Hirano | 340/825 |
| 4,906,828 | 3/1990 | Halpern | 235/379 |
| 4,991,008 | 2/1991 | Nama | 358/108 |
| 5,111,199 | 5/1992 | Tomoda et al. | 340/825 |
| 5,113,183 | 5/1992 | Mizuno et al. | 340/825 |
| 5,113,184 | 5/1992 | Katayama | 340/825 |
| 5,130,519 | 7/1992 | Bush et al. | 235/380 |
| 5,191,192 | 3/1993 | Takahira et al. | 235/375 |
| 5,216,502 | 6/1993 | Katz | 358/108 |
| 5,235,630 | 8/1993 | Moody et al. | 379/37 |
| 5,253,167 | 10/1993 | Yoshida et al. | 364/408 |
| 5,265,162 | 11/1993 | Bush et al. | 380/24 |
| 5,266,782 | 11/1993 | Alanara et al. | 235/380 |
| 5,305,370 | 4/1994 | Kearns et al. | 379/45 |
| 5,315,645 | 5/1994 | Matheny | 379/144 |
| 5,317,309 | 5/1994 | Vercellotti et al. | 340/825 |
| 5,319,364 | 6/1994 | Waraksa et al. | 340/825 |
| 5,319,711 | 6/1994 | Servi | 380/23 |
| 5,345,231 | 9/1994 | Koo et al. | 340/870 |
| 5,347,263 | 9/1994 | Carroll et al. | 340/572 |
| 5,354,974 | 10/1994 | Eisenberg | 235/379 |
| 5,382,778 | 1/1995 | Takahira et al. | 235/380 |
| 5,465,401 | 11/1995 | Thompson | 379/357 |
| 5,467,082 | 11/1995 | Sanderson | 340/825 |
| 5,484,997 | 1/1996 | Haynes | 235/492 |
| 5,517,188 | 5/1996 | Carroll et al. | 340/825 |
| 5,548,632 | 8/1996 | Walsh et al. | 379/58 |
| 5,550,359 | 8/1996 | Bennett | 235/382 |
| 5,550,535 | 8/1996 | Park | 340/825 |
| 5,565,857 | 10/1996 | Lee | 340/825 |
| 5,740,232 | 4/1998 | Pailles et al. | 379/93.02 |

*Primary Examiner*—Paul Loomis
*Attorney, Agent, or Firm*—Thomas, Kayden, Horstemeyer & Risley

[57] ABSTRACT

A system and method for providing remote access to a pay-type telephone. In accordance with one aspect of the invention, the system includes a pay-type telephone, and a receiver provided at the telephone for receiving data transmitted via a electromagnetic waves. Although not necessary for the invention, in a preferred the telephone includes a card reader for receiving and reading magnetically encoded cards. In this embodiment, the receiver is operatively and electrically connected to the magnetic card reader, so as to allow the system to operate either by access from a remote transmitter or by way of an inserted card. The system of the invention further includes a remote access unit having a memory configured to store user identification data and a low-power transmitter adapted to transmit the user identification data to the receiver. The remote access unit is manually operated by a transmit button, which, when depressed, causes a controller to retrieve user identification data from the memory and transmit the user identification data from the low-power transmitter.

12 Claims, 4 Drawing Sheets

AFTM 5,926,531

TRANSMITTER FOR ACCESSING PAY-TYPE TELEPHONES

CROSS-REFERENCE TO RELATED APPLICATIONS

This application is a continuation-in-part of U.S. patent application Ser. No. 08/825,576, filed on Mar. 31, 1997, and entitled Transmitter for Accessing Automated Financial Transaction Machines. This application further claims the benefit of U.S. provisional patent application Ser. No. 60/040,316, filed Feb. 14, 1997, and entitled Card Replacement Transceiver For Use With Automatic Teller Machines.

BACKGROUND OF THE INVENTION

1. Field of the Invention

The present invention generally relates to a system for automatic financial transaction machines, and more particularly to a transmitter for accessing various automatic financial transaction machines, including automatic teller machines.

2. Discussion of the Related Art

In recent years, there has been a vast proliferation in automatic and automated banking and other financial transactions. This advancement has been driven, in large part, by the development of more powerful computers and electronic computing devices. Automatic teller machines embody one such example. However, the list does not end there. As is now well known, many supermarkets employ a financial transaction device. Whether they operate from a banking card, debit card, or a credit card, these devices allow a patron to make a non-cash grocery purchase. Many gas pumps are now equipped with a mechanism, such as a credit card reader, to allow patrons to make non-cash purchases. Similarly, many pay-type telephones accept payment by way of magnetically encoded calling cards.

While such automated financial transaction machines have greatly enhanced customer convenience, particularly for after-hours banking, there are various shortcomings in these devices. For example, these automated devices are generally operated by a user inserting a plastic card into a card receiving slot. The plastic card includes a ferromagnetic strip that is encoded with certain user-identifying information, including an account number. This account number may be an account number for a banking account, a credit account, a debit account, etc. A corresponding transducer is provided in connection with the card receiving slot to "read" the magnetic information stored on the card. This information is then transmitted, generally through a computer network, to an appropriate location so that the user or customer may access the appropriate identified account. Certain safeguards, such as requiring the customer to manually input a unique identifying personal identification number are also employed by the automated machine to provide security to the customer's account in the event that a banking card is lost or stolen.

One of the shortcomings noted in these automated financial transaction machines relates to the high incidence of failure in the card reading devices. Specifically, it is known that the mechanical card reading device often fails, which leads to customer aggravation. The relatively high failure rates noted in the card reading devices is partially attributable to the inherent inaccuracies in such mechanical devices, but is quite often attributable to dirty or damaged banking cards. Indeed, men generally carry such cards in a billfold, which is worn on their person, and which, over time, fatigues the card or otherwise corrupts the magnetic strip containing the user's account information.

Another problem noted with these types of cards, particularly in connection with automatic banking machines, relates to increased risks of being robbed. The very fact that the vast majority of people store their banking (or other) cards either in a billfold or in a purse generally results in the persons having their billfolds and/or purses exposed during the time of the banking transaction. Thus, the fact that a person must generally retrieve the automated banking card from a billfold and/or purse typically requires a greater amount of time, thus further increasing the risk of unlawful activity.

Therefore, there is a tremendous need and desire to provide an improved mechanism for accessing various automated financial transaction machines. Several attempts to provide such apparatus are known in the prior art. For example, U.S. Pat. No. 4,757,185 discloses an automated cash transaction apparatus, which includes a circuit for performing signal reception and transmission with a card carried by a user. The signal reception and transmission is transmitted via electromagnetic waves. Similarly, U.S. Pat. No. 5,565,857 discloses a rather sophisticated electronic identification system having remote automatic response capability. Indeed, both of these devices disclose rather sophisticated electromagnetic transceivers capable of wireless, bi-directional communication with a remote device. A particular and acute shortcoming in these and similar devices relates to the relative sophistication, and therefor expense, of the circuitry required to implement the functionalities therein. Particularly for purposes of the banking industry, it is desired to be able to provide a very low cost device, and for this reason, banking cards encoded by a ferromagnetic strip have heretofore been preferred. In the case of a bank providing automated access to a customer account, each customer is generally provided with one or more such access devices, and for this reason, the relatively sophisticated transceiver circuits of U.S. Pat. Nos. 4,757,185 and 5,565,857 generally provide a cost prohibitive mechanism for wide spread use.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system for providing remote access to a pay-type telephone. In accordance with one aspect of the invention, the system includes a pay-type telephone, and receiving means provided at the telephone for receiving data transmitted via a electromagnetic waves. Although not necessary for the invention, in a preferred the telephone includes a card reader for receiving and reading magnetically encoded cards. In this embodiment, the receiving means is operatively and electrically connected to the magnetic card reader, so as to allow the system to operate either by access from a remote transmitter or by way of an inserted card. The system of the invention further includes a remote access unit having a memory configured to store user identification data and a low-power transmitter adapted to transmit the user identification data to the receiving means. The remote access unit is manually operated by a transmit button, which, when depressed, causes a controller to retrieve user identification data from the memory and transmit the user identification data from the low-power transmitter.

In accordance with another aspect of the invention, a method is provided for accessing a pay-type telephone. This aspect of the invention comprises the step of depressing a manually-operative transmit button of a remote-access unit to begin the remote access sequence. This sequence begins by retrieving predefined user identification information from an internal memory of the remote access unit, formatting the retrieved user identification information into a predefined signal for transmission, and transmitting a low-power electromagnetic signal including the formatted user identification information. Then, the telephone operates to receive the transmitted electromagnetic signal. Thereafter, the telephone verifies that acceptable information received from the transmission, and accesses a financial account that corresponds to the user identification information. Based upon the account information (e.g., the account has sufficient funds), the system will authorize/enable use of the telephone. In accordance with a preferred embodiment of the invention, the telephone includes a magnetic card reader, and so the preferred method includes the step of bypassing the mechanical magnetic card reading device.

DESCRIPTION OF THE DRAWINGS

The accompanying drawings incorporated in and forming a part of the specification, illustrate several aspects of the present invention, and together with the description serve to explain the principles of the invention. In the drawings.

Figure 1A:
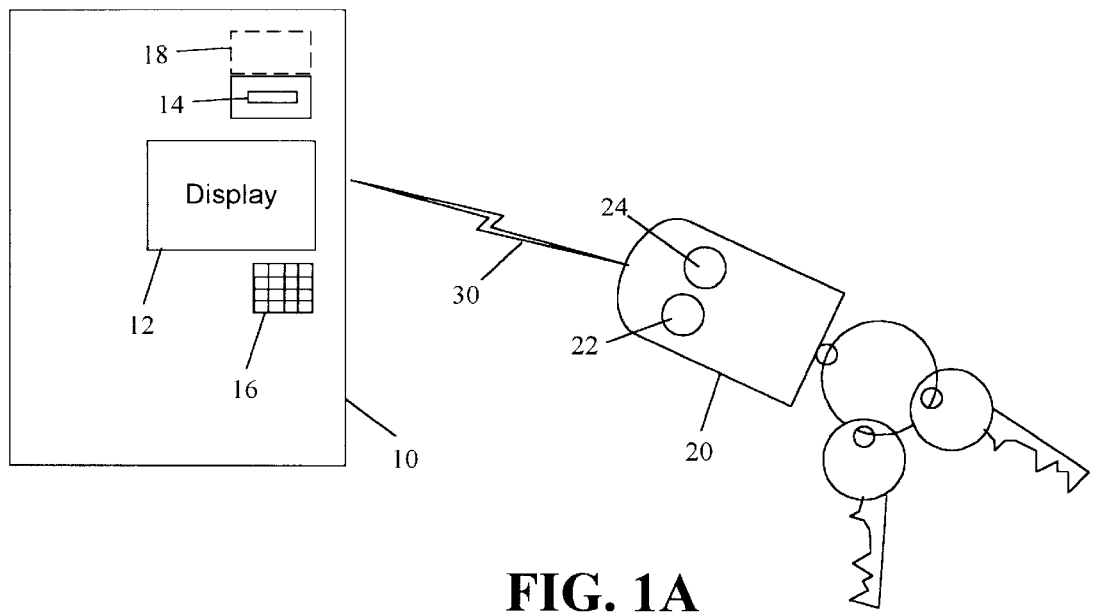
FIGS. 1A and 1B are system-level block diagrams, illustrating the principal components of a system constructed in accordance with the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Turning now to the drawings, FIG. 1A shows a system level block diagram of an automatic financial transaction system constructed in accordance with the teachings of the present invention. More specifically, the figure shows an automatic financial transaction machine (AFTM) 10 being remotely accessed by a transmitter 20. The AFTM 10 may be any of a number of devices, including, most commonly, an automated teller machine for banking. However, the AFTM 10 may further encompass devices such as gas pumps of the type equipped to receive credit cards for charging an otherwise cash transaction. It will be appreciated that other similar devices fall within the scope of the present invention.

Figure 1B:
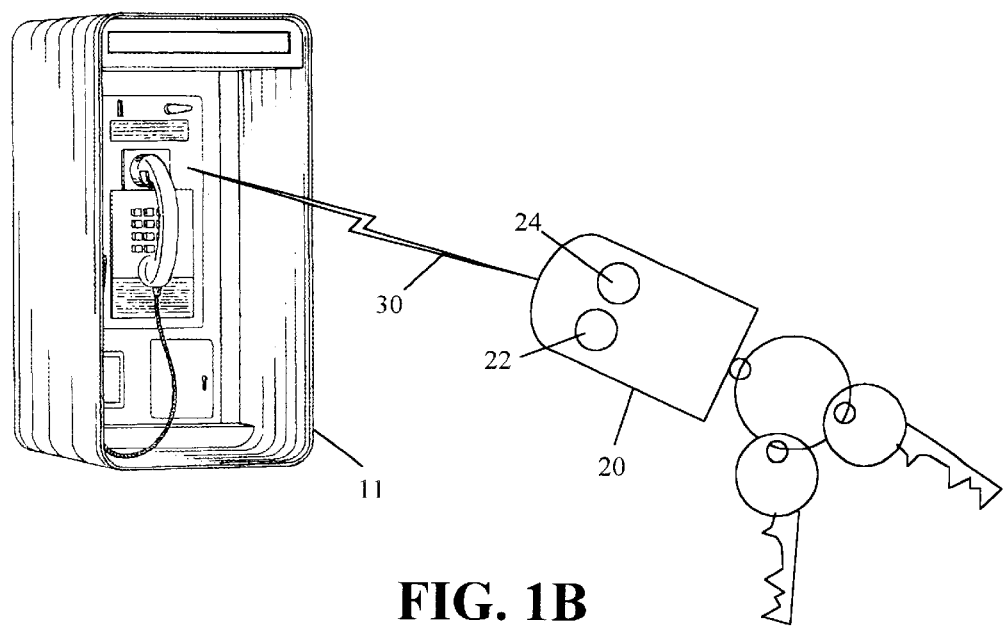

For example, FIG. 1B shows a similar diagram that specifically illustrates the present invention, as embodied in a pay-type telephone 11. Although not shown if FIG. 1B, a receiver (discussed below) is provided in connection with the telephone 11 (receiver preferably internal) that receives electromagnetic signals for access to the telephone 11. This receiver forms an integral part of the present invention, and will be further discussed below. Hereinafter, unless specifically noted otherwise, general reference to the AFTM 10, will be understood to encompass the various types of equipment, including pay-type telephones, that are contemplated by and encompassed within the teachings of the present invention.

In the embodiment illustrated in FIG. 1A, the AFTM 10 includes a display 12, such as a CRT, for providing a visual display to a user. A card receiving slot 14 is also shown. As is known, the card receiving slot 14 receives a plastic card such as a bank card, credit card, or some other magnetically encoded card for purposes of user identification. In accordance with the broad concepts of the present invention, the card receiving slot 14 may be omitted, as it is not necessary, and indeed is not utilized, in connection with the remote access capability taught and achieved by the present invention. However, in the presently preferred embodiment, the present invention will work in conjunction with a card receiving slot 14 to provide enhanced flexibility, in that such AFTM's 10 would allow access by both remote transmitters 20 of the type disclosed herein, or alternatively, by the traditional manner of inserting a magnetically encoded card. A key pad 16 for inputting information, such as a personal identification number (PIN), transaction amounts, and other information is also illustrated in the drawing.

Finally, the last functional block illustrated in the AFTM 10 of FIG. 1 is receiving unit 18. The receiving unit 18 has been illustrated in dashed lines, since it will typically reside inside the AFTM 10. The receiving unit 18 is adapted to receive a signal transmitted from a remote transmitter 20, interpreting that signal in order to allow a user access to the AFTM 10. Preferably, the receiving block 18 comprises a radio frequency (RF) receiving for receiver electromagnetic waves transmitted from an RF transmitter contained with the remote transmitter unit 20. However, consistent with the concepts and teachings in the present invention, the receiving block 18 may be configured to receive other wavelength electromagnetic signals, including ultrasonic or infrared.

A remote transmitting unit 20 is provided for remote communications with the AFTM 10. While the transmitter 20 will be described in more detail below, it broadly operates to transmit an electromagnetic signal 30 to a receiver located at the AFTM 10, wherein said electromagnetic signal is encoded with user identifying information to allow a user to gain access to the AFTM 10. In this regard, an internal transmission circuit (not shown) is provided within the transmitter 20 to act upon command to transmit the encoded electromagnetic signal 30. A transmit button 22 is provided for the user. As illustrated in the preferred embodiment, the transmitter 20 is quite small and may be conveniently attached, for example, to a key ring for ready and portable use. Indeed, in one embodiment, the single transmitter constructed in accordance with the present invention may serve multiple functions. For example, small transmitters of this type are known for activating and deactivating automobile alarm systems. The transmitter of the present invention may be integrally designed with such an automobile remote to provide the dual functionality of remotely controlling an automobile alarm along with the functionality of remote access to an AFTM 10. In accordance with such an embodiment, a second transmit button 24 would be provided. In this regard, the first transmit button 22 would be operative to, for example, operate the AFTM 10, while the second transmit button 24 would be operative to remotely operate the automobile alarm. It will be appreciated that the frequency, and/or format of the transmit signal 30 transmitted will be different for the different applications. For example, the signal transmitted to AFTM 10 must include account identification information, while only a unique activation sequence need be transmitted to actuate an automobile alarm.

In yet a further embodiment, additional transmit buttons (not shown) may be provided as well. To illustrate, presently people typically carry multiple banking and/or credit cards in their billfolds or purses. In accordance with one embodiment of the present invention, a transmitting unit 20 may be provided with multiple transmit buttons, wherein a transmit button 22, 24 is uniquely assigned to a different banking and/or credit card. Therefore, if a user has a bank checking account, and credit accounts with other financial institutions for both VISA and MASTERCARD credit cards, then three distinct transmit buttons would be provided for accessing the three different accounts. It should be appreciated that many AFTM's 10 presently allow access to a wide number and variety of accounts, including MASTERCARD, VISA, AMERICAN EXPRESS, etc. Such a machine would be constructed in accordance with the invention to recognize the transmissions from each of the different transmit buttons depressed. In accordance with the description provided below, the various user/account information will be different for each account, and therefore, the signal transmitted will be different. Providing a separate transmit button for each of these functions/account simplifies the user interface. A simpler way to envision the transmitter 20 is to recognize that each individual credit/banking card that a user may carry in a billfold or purse would be replaced by an additional transmit button on the transmitter 20.

In use, a user would simply depress a transmit button 22, which would result in the transmitter 20 transmitting an electromagnetic signal 30 to a remote AFTM 10. Preferably, the transmitter 20 is an extremely low power transmitter, so that a user will have to be in close proximity, (e.g., several feet) to the receiver 18 of an AFTM 10 in order to use the transmitter. This would help alleviate problems which may otherwise occur if a user approaching an AFTM 10 is circumvented by a second, more distantly located user who depresses his transmit button. This extremely low-power operation helps to prevent the unlawful interception of the electromagnetic signals. In addition, in an alternative embodiment of the invention, the transmitted signal may be encrypted for further protect against such unlawful interception.

A receiving unit 18 within the AFTM 10 receives and decodes the signal 30. The AFTM 10 then evaluates the received, decoded signal to ensure that it identifies a legitimate user/account. If so, the user may then access the AFTM 10. In the case of an automatic teller machine, or other similar AFTM 10, a user may then be prompted to enter a personal identification number (PIN) into, for example, key pad 16, as an added measure of security. However, in many AFTM's, a user will not need to make any further input. For example, many gas pumps, telephones, and other similar devices are presently automated to receive an inserted credit card and debit the corresponding account according to the amount of gasoline purchased. Presently, there is no need in these devices for a user to manually key in a personal identification number. In similar fashion, the present invention may be configured to operate automatically and exclusively by the depression of a transmit button on the transmitter 20.

Figure 2:
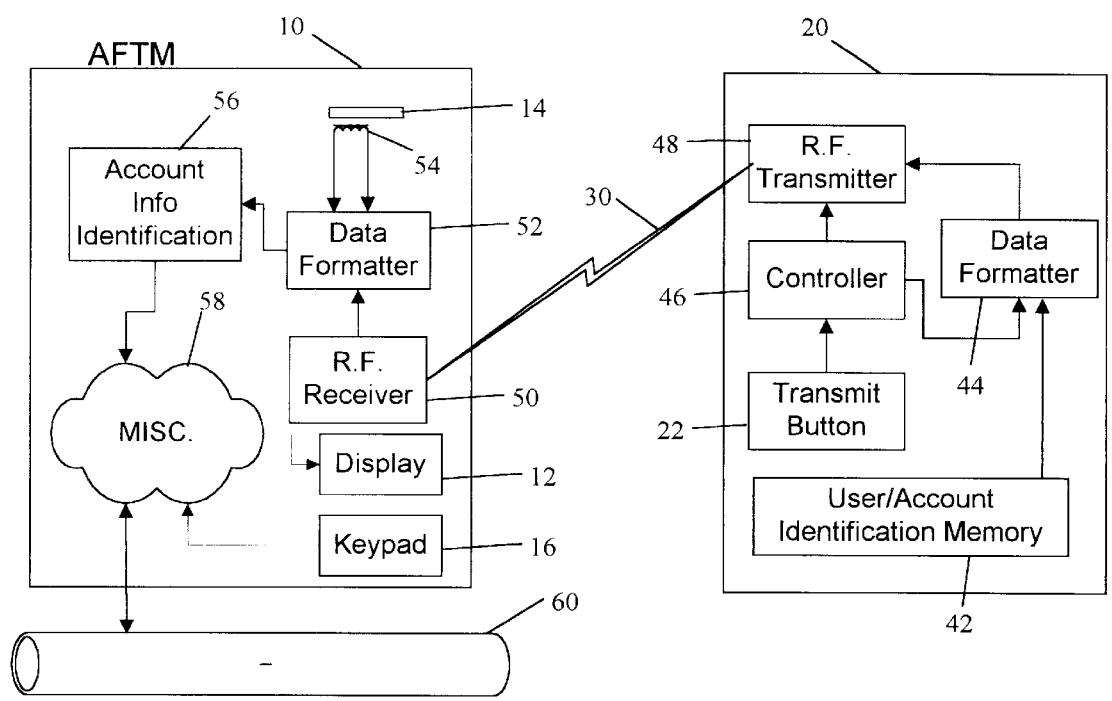
FIG. 2 is a block diagram depicting the functionality of a transmitter and AFTM constructed in accordance with the preferred embodiment of the present invention.

Having now presented an overview of the basic operation of the present invention, reference is made to FIG. 2 which shows a more detailed block diagram of the components contained within the AFTM 10 and remote transmitting unit 20. As previously mentioned, the transmitting unit 20 includes a transmit button 22, which initiates the data transmission. The other primary functional blocks of the transmitter 20 include a memory 42, a data formatter 44, a controller 46, and an RF transmitter 48. It will be appreciated that the functional blocks shown in FIG. 2 are shown for purposes of illustration and facilitating a better understanding of the broad concepts of the present invention. The functional blocks of the illustrated embodiment should not, however, be viewed as specific limitations on the invention. For example, data formatter 44 and controller 46 (discussed below) may be embodied in a single functional unit. Indeed, it is contemplated that the entirety of the circuitry of the transmitter 20 will be contained within a single integrated circuit component.

In keeping with the description of the transmitter 20, the controller 46 lies at the heart of the transmitter 20, and serves to control the overall functionality thereof. In this regard, the controller 46 is responsive to the depression or actuation of transmit button 22 to begin the data transaction and signal transfer. More particularly, when a user depresses the transmit button 22, the controller 46 initiates the data transmission sequence by accessing an internal memory 42, which, among other things, stores user and/or account identification information. This information is then passed to a data formatter functional block 44 which places the data in an appropriate and predefined format for transmission to the AFTM 10. It is contemplated that the above-described functionality occurs in electronic format. This electronic data is then sent from data formatter 44 to an RF transmitter 48 for conversion from electric to electromagnetic form. As is well known by those skilled in the art, a variety of transducers can perform this functionality adequately. The particular data format, or transmit protocol, will be described in more detail in connection with FIG. 4.

The AFTM 10 receives the transmitted electromagnetic signal 30 at an RF receiver 50. This receiver serves to convert the data from electromagnetic format into electrical format (i.e., a digital signal) and passes that data to a data formatter 52. Also illustrated as comprising principal functional components of the AFTM 10 are the magnetic card receiving slot 14, a transducer or magnetic pick-up 54, the display 12, the keyboard 16, a block denoted as Account Info Identification 56, a cloud denoted as miscellaneous 58, and a network link 60.

In a manner that is well known, a magnetically encoded card is inserted into slot 14, wherein the information encoded on the card's magnetic strip is read by transducer or magnetic pick-up 54. The electric signals from this pick-up 54 are then formatted into a suitable, preferably digital, form by data formatter 52. For purposes of simplifying the description, the data formatter 52 (shown as a single block) receives signals from both the transducer 54 and the RF receiver 50. It will, however, be appreciated that the data formatting function of block 52 may be provided by two separate and distinct formatting units. In this regard, a preferred embodiment of the present invention is contemplated to be a retrofit, or a simple add on, into presently existing financial transaction machines. In such a retrofit system, the functionality of such data formatter 52 would indeed be performed by distinct physical units.

In keeping with the description of the AFTM 10, the information received and formatted by the data formatter 52 is then transmitted to a block denoted as Account Information Identification 56. This functional block serves to verify that the information received, either from the encoded card inserted into slot 14, or the signal received by the RF receiver 50 is valid. To do this, the AFTM 10 will generally access a centralized database (not shown) via a network link 60. It will be appreciated that this account verification functionality is well known in the prior art, and therefore, need not be discussed herein.

Finally, a block 58 denoted as "Misc." is illustrated within the AFTM 10. This functional block 58 performs a variety of functional features which depend, in part, upon the specifics of the machine 10. For example, the block will manage user input and output to and from the display 12 and keypad 16, as well as network 60 management and access. It would further serve to access any database of information that is stored locally at the AFTM 10. This block 58 has been denoted broadly herein as "Misc." because it deals with features and functionality of AFTMs 10 which are not pertinent to an understanding of the present invention, and need not be discussed herein.

Figure 3:
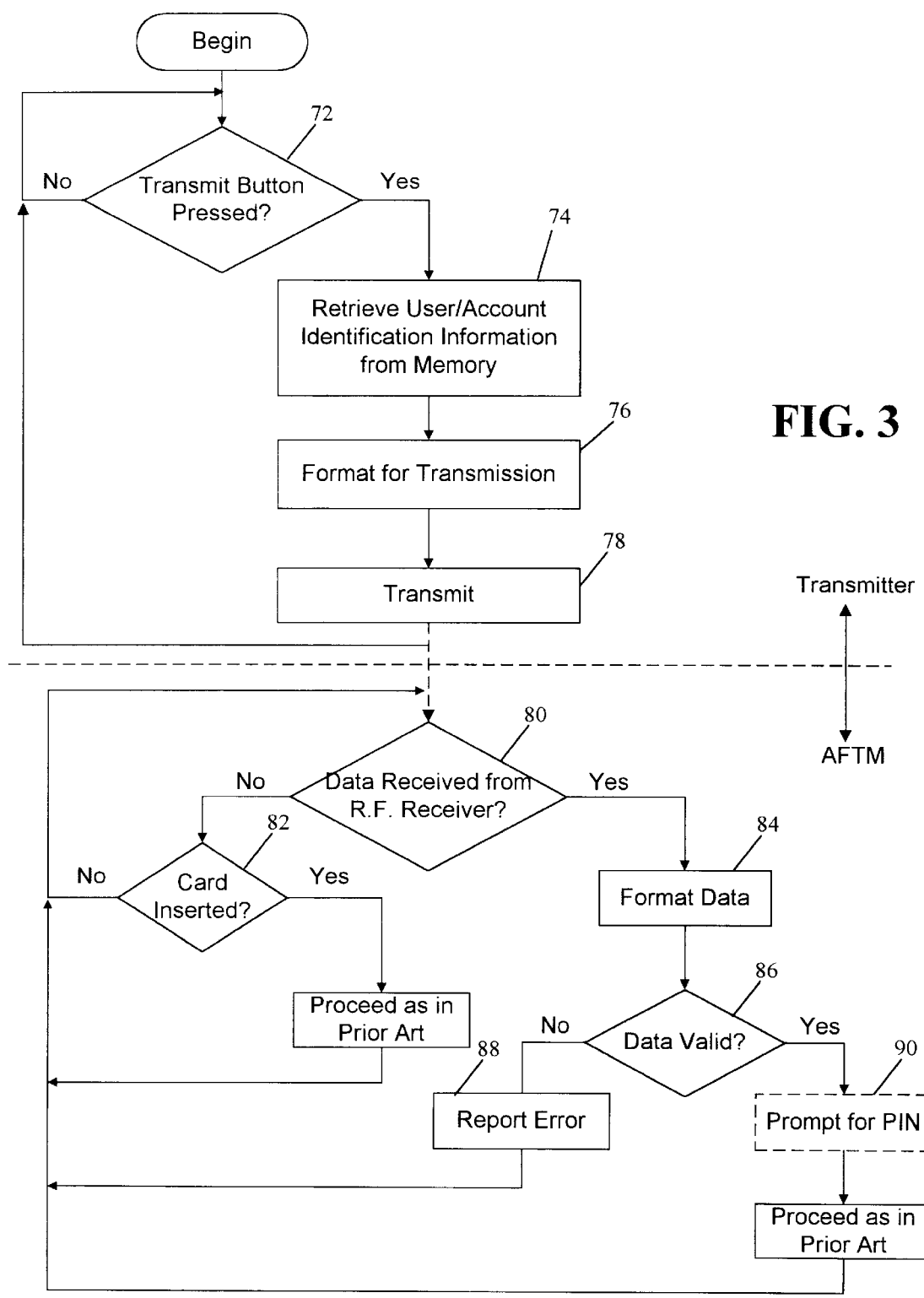
FIG. 3 is a software flowchart illustrating the primary steps in the operation of the preferred embodiment of the present invention.

Having described the relevant functional aspects and components of the AFTM 10 and transmitting unit 20, reference is now made to FIG. 3, which is a flow chart illustrating the principal operation of a system constructed in accordance with the teachings of the present invention. For clarity, a dashed horizontal line has been drawn near the center of FIG. 3. The functionality denoted in the blocks above the dashed line reflect functions and features which take place within the transmitter unit 20. The blocks depicted below the horizontal line reflect functions and features that take place within the AFTM 10. It is contemplated that each unit of the system will separately operate in a repeating and continuous loop, and the flowchart of FIG. 3 is provided merely for illustration. Upon power-up (denoted as the BEGIN state), the transmitter 20 begins to monitor the transmit button 22 (step 72). For simplicity and illustration, the flow chart of FIG. 3 assumes that the transmitter 20 has only a single transmit button 22. However, as has been previously described, alternative embodiments of the present invention may embody multiple transmit buttons. In these situations, the functional block denoted as step 72 would recognize the depression of any one of the transmit buttons, identify the particular button depressed, and take the appropriate and corresponding actions. Once the transmit button is depressed and the condition denoted in step 72 resolves to the true state, the transmitter unit 20 then operates to retrieve the user and/or account identification information from a memory unit stored on the transmitter 20 (step 74). Thereafter, that data is sent to formatter which formats the data for transmission in accordance with the format, which will be further described in connection with FIG. 4 (step 76). Finally, the transmitter 20 sends the data from the data formatter to an RF transmitter, and transmits the data via electromagnetic waves (step 78). After executing step 78, the functional loop of the transmitter unit 20 will proceed back up to, once again, begin monitoring the transmit button at step 72.

As represented by dashed lines, data is transmitted to a receiver unit which is contained at an AFTM 10. Like the transmitter 20, the functionality of the AFTM 10 repeats continuously in an infinite loop. As a first step, the receiver looks to see if data is received either from an RF receiver (step 80) or alternatively from an magnetically encoded card inserted into the card receiving slot of the AFTM 10 (step 82). In the event that a magnetic card is inserted (step 82 resolves to true) the system merely proceeds in a manner that is known in the prior art, and therefore, need not be described therein. If, however, step 80 resolves to true, and the receiver recognizes data transmitted from the RF transmitter, then the system proceeds to step 84 where the data is formatted. Thereafter, and in a manner generally known, the system will check to see if the data received was valid (step 86), and if not, the system may report an error at step 88 and return to the beginning step. Alternatively, if the data received from the RF receiver is determined to be valid, step 86 resolves to true, then the system may optionally prompt the user to enter a PIN number step 90, and then proceed in a manner known in the prior art. As an optional step, step 90 has been illustrated in dashed lines.

Figure 4:
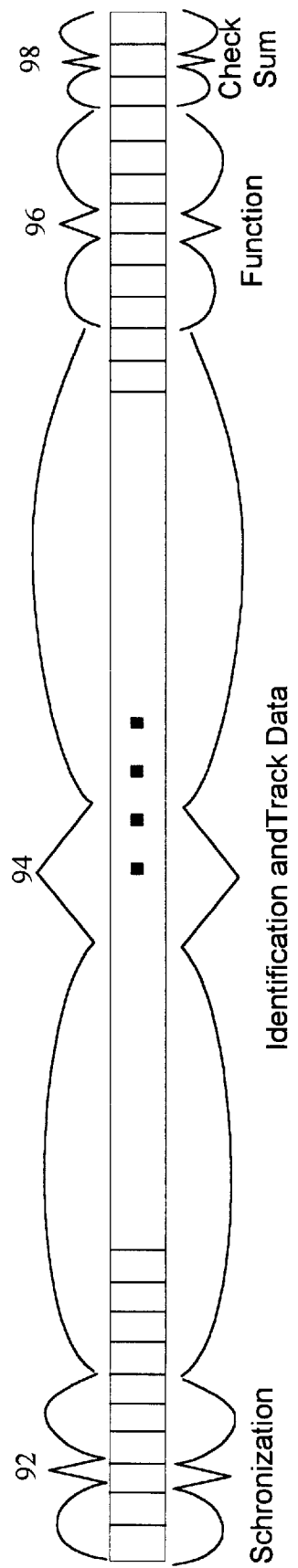
FIG. 4 is a diagram illustrating a data packet or transmission protocol of the illustrated embodiment of the present invention.

Referring now to FIG. 4, a data packet, or transmission protocol of a preferred embodiment of the present invention is shown. In accordance with the preferred embodiment, the transmission protocol includes a transmission of approximately 200 bytes from the transmitter for accessing the AFTM 10. The first few bits 92 are synchronization bits that are used to synchronize the receiver with the transmission. By providing such synchronizing bits, the receiver is able to discriminate against unwanted electromagnetic signals.

Following the synchronization bits, are a number of data bytes 94, which transmit the transmitter code, and include track one and track two data. As is known, track one data typically includes a person's name. Track two data, however, typically includes the person's account number and the encoded pin number. Following the data bytes 94 is a function byte 96. This byte includes bits that identifies the transmitted function. For example, whether the function is an ATFM access, a text code, automobile lock, a distress call (in the embodiment discussed below), etc. It also includes test bits that are use if the function is a test sequence. This is merely a function provided in connection with the preferred embodiment as a means of testing the transmission.

Finally, check bits 98 are provided as a means for the receiver to determine whether the received packet was properly received. Preferable, the check bits 98 are merely a sum of the total of the bits previously transmitted in the packet.

As previously mentioned, in one embodiment, the invention may provide multiple functionality through the utilization of multiple transmit buttons. One button may be for initiating ATFM access, while another button may be for activating an automobile lock/alarm system. Still a further button could be provided in connection with a distress feature. That is, the button could cause the transmitter to transmit a sequence of bits that indicate a distress call. When such a bit-stream is received by the receiver, the system would transmit an appropriate alert over the network link to a law enforcement agency, a hospital emergency dispatch, etc. By including personalized information within the transmission, the responding emergency personnel are better able to respond to the distress signal.

In accordance with the concepts and teachings of the present invention, and as will be appreciated by persons of ordinary skill in the art, the particular data transmitted over the electromagnetic signal may vary. For example, track one and track two data may be transmitted in automated banking machine embodiments, while differing data may be transmitted in pay-type telephone 11 (See FIG. 1B), gas pump, and other embodiments. The data transmitted will necessarily depend upon the information typically encoded on a magnetic strip or otherwise defined by the card or equipment provider.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for providing remote access to a pay-type telephone, comprising:

receiving means for receiving data transmitted via a electromagnetic waves, the receiving means being operatively disposed with the pay-type telephone; and a remote access unit having a memory configured to store user identification data and a low-power transmitter adapted to transmit the user identification data to the receiving means, the remote access unit further having a manually-operated transmit button and a controller, responsive to the transmit button, to controllably retrieve user identification data from the memory and transmit the user identification data from the low-power transmitter.

2. The system as defined in claim 1, wherein the user identification data includes an financial account number.

3. The system as defined in claim 1, wherein the receiving means receives electromagnetic data in a wavelength selected from the group consisting of:

radio frequency;
   ultrasonic; and
   infra-red.

4. The system as defined in claim 1, wherein electronic circuitry that carries out the functionality of the remote access unit is contained within a single integrated circuit.

5. The system as defined in claim 1, wherein the remote access unit includes means for formatting the user identification data into a data packet for transmission to the receiving means.

6. The system as defined in claim 1, wherein the remote access unit further includes a second transmit button.

7. A method for accessing a pay-type telephone comprising the steps of:

depressing a manually-operative transmit button of a remote-access unit, retrieving predefined user identification information from an internal memory of the remote access unit;

formatting the retrieved user identification information into a predefined signal for transmission;

transmitting a low-power electromagnetic signal including the formatted user identification information;

receiving the transmitted electromagnetic signal at the telephone;

verifying that acceptable information received from the electromagnetic transmission;

accessing a financial account using user identification information; and authorizing the use of the telephone, based upon information obtained from the financial account.

8. The method as defined in claim 7, wherein the step of transmitting a low-power electromagnetic signal includes transmitting a low-power radio frequency signal.

9. A system for providing remote access to a pay-type telephone, comprising:

a pay-type telephone;

receiving means associated with the telephone for receiving data transmitted via a electromagnetic waves;

a remote access unit having a memory configured to store user identification data and a low-power transmitter adapted to transmit the user identification data to the receiving means, the remote access unit further having a manually-operated transmit button and a controller responsive to the transmit button to controllably retrieve user identification data from the memory and transmit the user identification data from the low-power transmitter.

10. The system as defined in claim 8, wherein the telephone includes a magnetic card reader.

11. The system as defined in claim 9, wherein the receiving means is operatively and electrically connected to the magnetic card reader.

12. A system for providing access to a pay-type telephone comprising:

a remote-access transmitter having a manually-operative transmit button;

means for retrieving predefined user identification information from an internal memory of the remote access unit, in response to depression of the transmit button;

means for formatting the retrieved user identification information into a predefined signal for transmission;

means for transmitting a low-power radio frequency electromagnetic signal including the formatted user identification information;

means for receiving the transmitted radio frequency electromagnetic signal at a automated financial transaction machine;

means for verifying that acceptable information received from the radio frequency transmission;

means for accessing a financial account using user identification information; and means for authorizing the use of the telephone, based upon information obtained from the financial account.

\* \* \* \* \*